July 19, 1938.  C. C. STREET  2,124,014
GAUGE
Filed June 23, 1936
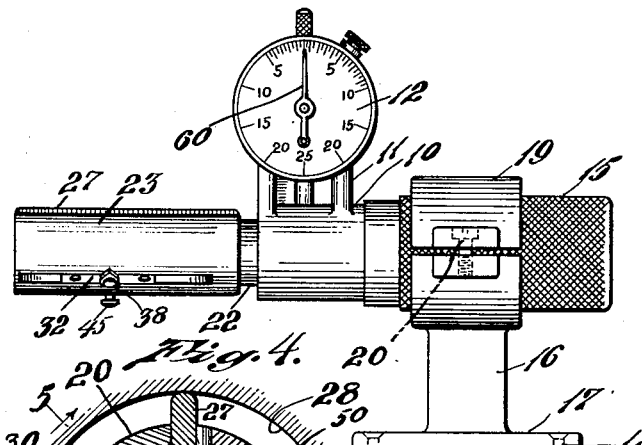
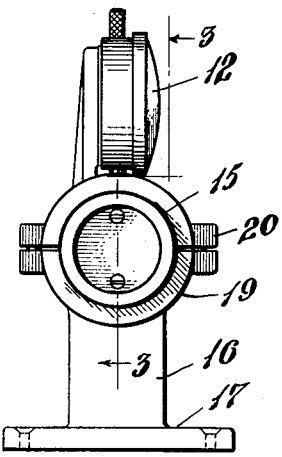
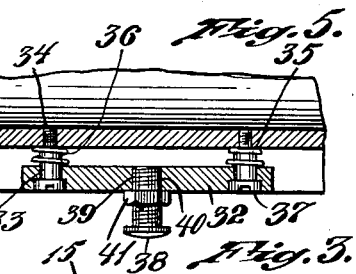
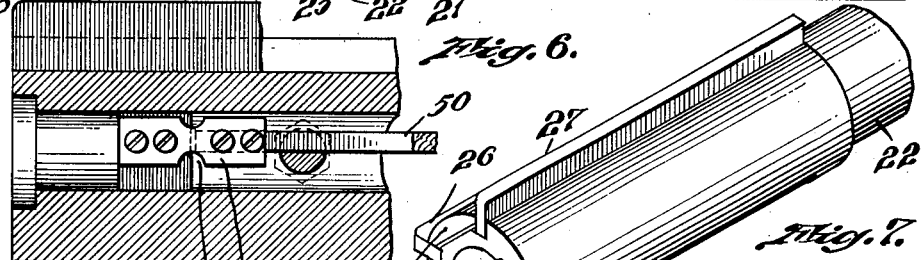
INVENTOR.
Chauncey C. Street.
BY Barlow & Barlow
ATTORNEYS.

Patented July 19, 1938

2,124,014

UNITED STATES PATENT OFFICE 2,124,014

GAUGE

Chauncey C. Street, Providence, R. I., assignor to Federal Products Corporation, a corporation of Rhode Island Application June 23, 1936, Serial No. 86,744

10 Claims. (Cl. 33—178)

This invention relates to a plug type limit gauge for testing and checking internal dimensions; and has for one of its objects the provision of a single instrument which may have a greater range of operation than instruments which are now in use.

Another object of the invention is the provision of an instrument which by reason of interchangeable parts may be varied from one range to another range by a simple manual interchange of these parts.

Another object of the invention is the provision of means for accurately positioning the gauge within the work to be tested or checked with separate additional means for operating a dial indicator.

Another object of the invention is to have a three point contact for accurately positioning the gauge within the work to be tested with means additional to and separate from the three contacting points for operating a dial indicator.

Another object of the invention is to provide a means for transmitting motion through a lever having no mechanical joint or hinge about which it moves.

Another object of the invention is the provision of a lever which is mounted in such a manner as to have no mechanical joint or hinge and yet a mounting which tends slightly to cause the lever to move in one direction for holding the same against the plunger of the dial indicator.

Another object of the invention is the provision of a mounting for a motion transmitting and multiplying lever having no mechanical joint or hinge and thus one in which no lubrication is required for effective operation.

Another object of the invention is an instrument with which most any standard indicator can be used.

With these and other objects in view, the invention consists of certain novel features of construction, as will be more fully described, and particularly pointed out in the appended claims.

In the accompanying drawing:

Fig. 1 is a side elevation showing the gauge as mounted in a stand for bench use;

Fig. 2 is an end elevation thereof;

Fig. 3 is a sectional view on substantially the line 3—3 of Fig. 2;

Fig. 4 is a sectional view on the line substantially 4—4 of Fig. 3, and showing the device as within a cylindrical bore to be checked;

Fig. 5 is a sectional view of a fragmental portion on substantially line 5—5 of Fig. 4;

Fig. 6 is a fragmental sectional view showing the mounting of the lever through which motion is transmitted to the dial;

Fig. 7 is a perspective view of the plug portion of the body which is inserted into the bore;

Fig. 8 is a diagrammatic view illustrating the relation of the body to the bore when a measurement occurs other than through the center thereof.

Heretofore, in limit plug gauges, where a three-point contact is had, usually one of these points is utilized for the operation of the indicator and thus a true measurement of the diameter through the center line is not had. Further, in these various constructions where there was a transmission of motion through some hingedly mounted part a certain undesirable looseness must be present in order that there be movement of the two parts; and in order to avoid these undesirable effects which heretofore existed, I have provided a three-point contact for the aligning and positioning of the body in the bore or internal dimension which is to be measured and have provided an additional feeler finger or measuring contact point which is diametrically opposite one of the lengthwise extending contact edges of the body, whereby a more nearly true diametrical measurement through the center line is obtained than in the type of gauge heretofore mentioned; and I have also mounted a lever through which motion is transmitted to the dial of the gauge in such a manner that no rocking about a pivot point is had, but rather, there is provided a leaf spring which may bend or rock to provide for the movement desired; and the following is a more detailed description of the present embodiment of this invention, illustrating the preferred means by which these advantageous results may be accomplished:

With reference to the drawing, 10 designates the body of the instrument, consisting of two parts. One part of the body 10 comprises a casting having a knurled handle 15 with a support 11 arranged for suitably mounting a standard dial indicator 12 in such a desired position relative to the body so that it can be read by observing the same from any particular direction, there being various arrangements which may be had; and the other body part comprises a cylindrical member 23 for insertion into the bore to be tested or checked. An opening 13 is provided in this body for the operating plunger 14 of the dial indicator to extend through. The handle 15 may be used for convenience in gripping the instrument for inserting it into a bore of the work to be tested, or for mounting the instrument in a bracket 16 having a base 17 which may be secured through openings 18 on some suitable bench or horizontal support and which is provided with an arcuate clamping portion 19 for securely holding the handle 15 therein by means of the set screws 20. These parts 10 and 23 of the body have a telescoping fit by means of a bore 21 in part 10 which receives the reduced portion 22 of the plug part 23 and which is held in this bore by screws 24 accessible through the opening 25 in the hollow handle 15.

A pair of longitudinally extending blades 26 and 27 are removably set into the body part 23 and project therefrom to provide spaced stationary contacts for engaging the bore 28 of the work which is to be tested or checked, and these blades being of an extended length contact along an extended length of the bore to properly align the body therein. These blades are held in the body by a removable cap 29 secured in position by the screws 30.

The body part 23 is provided with a longitudinally extending recess 31 at a point diametrically opposite a point half-way between the blades 26 and 27, and in this recess a plate 32 is mounted by means of studs 33 having a reduced threaded end portion 34 threaded into the body part against the shoulder 35 provided by said reduced threaded portion to limit the insertions of the members 33 into the body. The plate 32 is slidably mounted on these studs and is forced outwardly by springs 36 and limited in its outward movement by the heads 37 of the studs which are slotted for manipulation by a screw driver. The plate 32 carries a contact member 38 provided with threads 39 to engage a threaded opening 40 in the plate and the same is held in adjusted position therein by a check nut 41 which binds against the plate to secure the contact member 38 in desired position. This contact member 38 is thus resiliently mounted and extends outwardly in a plane which bisects the angle formed by planes extending through the center of the body and passing through the contact points of the blades 26 and 27; thus, as the body is inserted into a bore such as 28 the blades 26 and 27 serve to align the body with the axis of the bore in two different planes with these blades urged into proper contact with the bore by the resilient contact member 38 which is generally opposite and half-way between them.

An opening 43 extends diametrically across the axis of the body part 23 and in this opening there is positioned a sliding member 44 which has mounted at one end thereof a feeler contacting portion 45 which is threaded into this slide as at 46 and provided with a check nut 47 to hold the same in place and in proper position of adjustment. This slide 44 is provided with a recess 48 which receives a rounded enlargement 49 of a movement transmitting and multiplying lever 50 which is located in the central opening 51 in the body part 23 and which is mounted on the closure member 52 by means of a leaf spring 54 which is suitably secured by means of screws 55 to the member 52 and suitably secured by screws 56 to the lever itself. The closure member is held in position by screw 53. The end of the lever is cut away as at 57 and the end of the closure member 52 is suitably cut away as at 58 to provide proper clearance for the swinging of the lever about this resilient leaf spring as a center of movement when the slide 44 is moved within its bore 42.

The leaf spring 54 is notched as at 61 so as to locate the point of flexing, and by reason of the arc or curvature of the notch is such as to prevent a crack from starting which might occur should a sharper notch be formed, although the center of swing may vary somewhat in position due to different bending movements of the spring; the variation is so slight as to in no way affect the accurate reading of the indicator. In this manner, a hinge is provided and thus greater accuracy of movement of the member 44 is had for transmission of movement to the dial indicator 12.

The lever 50 is of such a length as to have its contact end 59 contact with the end of the plunger 14 which is forced downwardly by a spring within the dial indicator. The lever is of such length as to substantially multiply the movement of the slide 44 as for instance six times. It will, therefore, be apparent that as the feeler member 45 is moved to move the slide 44 inwardly, or the slide 44 is moved outwardly by reason of transmission of spring pressure thereto from the plunger 14, a pointer 60 over the dial of the indicator will move in response to the movement of the plunger except through a multiplied movement due to the arrangement of the parts just described, and the multiplication in the standard dial indicator itself. The indications on the dial are in ten thousandths of an inch. In this manner I position a gauge accurately within a bore due to the long blades which extend along in the direction of the axis thereof and in alignment with the axis of the bore with an entirely independent feeler for measuring the bore, which feeler is located diametrically opposite the blade 27 so that a substantially true diameter is measured.

This instrument is usually used for checking work as it is related to or varies from some standard measurement such as the inner diameter of a standard ring gauge. Thus, if the measurement is, as shown in Fig. 8, slightly to one side of a diameter through the center because of the proportions and arrangements of the contact points, the result will be immaterial as the same measurement will occur in the setting of the instrument in the standard gauge as in the work to be checked.

As the blades 26 and 27 are removably mounted, blades of greater radial extent may be had, and as the contact 38 is also removably mounted this may be interchanged with the contact of greater extent. Thus, the range of the gauge may be changed in ranges of each quarter of an inch. Thus, by the provision of interchangeable contacts, the limit plug gauge may be used for a large variety of ranges by merely interchanging the parts.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A gauge comprising a body having a pair of spaced relatively fixed contact members projecting therefrom, a relatively resiliently mounted third contact member projecting from said body and generally opposite and equally distant from each of said fixed contact members, a movably mounted feeler member located generally diametrically opposite one of said fixed contact members, and indicating means operatively connected to and responsive to the movement of said feeler member.

2. A gauge comprising a body having a pair of spaced stationary contact members projecting therefrom, a third contact member movably mounted on and projecting from said body at a point equally distant from each of said stationary contact members, a sliding member in said body and having a feeler member secured thereto provided with a contact surface located generally diametrically opposite one of said pairs of members, and indicating means operatively connected to and responsive to the movement of said feeler member.

3. A gauge comprising a body having a pair of removably mounted spaced stationary contact members projecting therefrom, a third contact member projecting from said body and movably mounted therein at a point equally distant from each of said stationary contact members, a feeler member located generally diametrically opposite one of said pair of members, indicating means operatively connected to and responsive to the movement of said feeler member, and means engaging both of said stationary contact members for removably holding the same mounted on said body.

4. In a gauge, the combination of a body member having a pair of spaced stationary contact blades removably supported on said body member and projecting therefrom, a resiliently mounted third contact member projecting from said body and generally opposite and equally distant from each of said stationary blades, a slide mounted for movement transversely of said body member in a direction generally diametrically opposite one of said blades and provided with a recess, a lever having a rounded enlargement which is located in said recess of the slide, and resilient means fixed at one end to said body member and having its other end secured to said lever for mounting the latter for swinging movement.

5. In a gauge, the combination of a body member having a pair of spaced stationary contact blades removably supported on said body member and projecting therefrom, a resiliently mounted third contact member projecting from said body and generally opposite and equally distant from each of said stationary blades, a slide mounted for movement transversely of said body member in a direction generally diametrically opposite one of said blades and provided with a recess, a lever having a rounded enlargement which is located in said recess of the slide, and a leaf spring fixed at one end to said body member and having its other end secured to said lever for mounting the latter.

6. In a gauge, the combination of a body member having a pair of spaced stationary contact blades removably supported on said body member and projecting therefrom, a resiliently mounted third contact member projecting from said body and generally opposite and equally distant from each of said stationary blades, a slide mounted for movement transversely of said body member in a direction generally diametrically opposite one of said blades and provided with a recess, a lever having a rounded enlargement which is located in said recess of the slide, and a leaf spring fixed at one end to said body member and having its other end secured to said lever for mounting the latter, said spring being notched for location of a flexing point about which the swinging movement of the lever occurs.

7. In a gauge, the combination of a hollow body member, a motion-transmitting and multiplying lever mounted within said body member for swinging movement therein, a dial indicator mounted exteriorly on said body member and having an operating plunger operatively engaging said lever, a pair of spaced, stationary, longitudinally extending contact blades mounted on said body member and projecting therefrom to engage the wall of a bore along spaced longitudinal lines thereof, a plate member arranged for movement transversely of said body member and being slidably mounted thereon in a longitudinally extending recess formed in said body member at a point diametrically opposite a point half way between said stationary blades, a contact member carried by said plate and projecting therefrom, and resilient means for forcing said plate outwardly to press said contact supported thereby into engagement with a wall portion of the bore and at a point thereof which is generally opposite and half way between the lines of contact of said stationary gauge blades on the opposite wall portion of the bore.

8. In a gauge, the combination of a body member, a movable feeler member therein, means movable in said body member for supporting said feeler member to permit movement of the latter in either direction transversely of said body member, said means being provided with a recess, a lever responsive to the movement of said feeler member for oscillatory swinging movement and having a portion located in said recess of the supporting means for the feeler member, an indicating device operated by said lever, and a bendable member fixed to said body member and said lever by which the latter is resiliently mounted for oscillatory swinging movement.

9. In a gauge, the combination of a body member, a feeler member slidably mounted in said body member, indicating means mounted on said body member, a lever, and a bendable member attached to said body member and said lever by which said lever is mounted for swinging movement relative to said body member, said bendable member being notched for location of a point of flexure about which the swinging movement of the lever occurs, said lever connecting said feeler member and said indicating means and through which movement is transmitted from one to the other.

10. In a gauge, the combination of a body member, a feeler member slidably mounted in said body member, indicating means mounted on said body member, a lever, and a leaf spring attached to said body member and said lever by which said lever is mounted for swinging movement relative to said body member, said leaf spring being notched on the arcs of circles for location of a point of flexure about which the swinging movement of the lever occurs, said lever connecting said feeler member and said indicating means and through which movement is transmitted from one to the other.

CHAUNCEY C. STREET.